(12) United States Patent
Wirola et al.

(10) Patent No.: US 10,827,452 B2
(45) Date of Patent: Nov. 3, 2020

(54) TRUSTWORTHINESS OF LOCATION ESTIMATES

(71) Applicant: HERE GLOBAL B.V., Eindhoven (NL)

(72) Inventors: Lauri Aarne Johannes Wirola, Tampere (FI); Petri Rauhala, Tampere (FI); Marko Luomi, Tampere (FI); Tatiana Vyunova, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/196,737

(22) Filed: Nov. 20, 2018

(65) Prior Publication Data
US 2020/0163041 A1    May 21, 2020

(51) Int. Cl.
*H04W 64/00* (2009.01)
*G01S 5/02* (2010.01)
*H04W 4/02* (2018.01)
*H04W 12/00* (2009.01)

(52) U.S. Cl.
CPC ......... *H04W 64/003* (2013.01); *G01S 5/021* (2013.01); *H04W 4/023* (2013.01)

(58) Field of Classification Search
CPC ... H04W 64/00; H04W 64/003; H04W 4/023; H04W 4/029; H04W 12/10; H04W 4/025; H04W 12/00524; H04W 12/00503; G06F 2221/2111; G01S 5/021; G01S 5/0244; G01S 5/0215; G01S 5/0252
See application file for complete search history.

(56) References Cited

U.S. PATENT DOCUMENTS

| | | |
|---|---|---|
| 9,207,304 B2 | 12/2015 | Haynes et al. |
| 9,282,435 B2 | 3/2016 | Ward et al. |
| 9,367,676 B2 | 6/2016 | Wilson |
| 9,420,430 B2 | 8/2016 | Wuoti et al. |
| 10,531,423 B1* | 1/2020 | Hassan .................. H04W 4/02 |
| 2012/0208557 A1 | 8/2012 | Carter |
| 2012/0282946 A1* | 11/2012 | Wigren ................ G01S 5/0257 455/456.1 |
| 2015/0081583 A1 | 3/2015 | Butler et al. |
| 2016/0128017 A1 | 5/2016 | Qin et al. |
| 2017/0371024 A1 | 12/2017 | Ivanov et al. |
| 2018/0020329 A1* | 1/2018 | Smith .................. H04W 4/029 |
| 2018/0352585 A1* | 12/2018 | Yang ......................... G01S 5/02 |

OTHER PUBLICATIONS

Extended European Search Report for Application No. 19210227.5 dated May 4, 2020, 11 pages.

* cited by examiner

*Primary Examiner* — George Eng
*Assistant Examiner* — Hung K Du
(74) *Attorney, Agent, or Firm* — Alston & Bird LLP

(57) ABSTRACT

Inter-alia, a method is disclosed comprising: obtaining one or more pieces of radio environment information representing a first radio environment of a first area that is covered by one or more radio units; obtaining or determining a location estimate; obtaining one or more pieces of reference radio environment information representing a second radio environment of a second area; and determining a trustworthiness information indicative of a degree of similarity between the first radio environment represented by the one or more pieces of radio environment information and the second radio environment represented by the one or more pieces of reference radio environment information. It is further disclosed an according apparatus, computer program and system.

20 Claims, 3 Drawing Sheets

TRUSTWORTHINESS OF LOCATION ESTIMATES

FIELD

The following disclosure relates to the field of positioning, or more particularly relates to systems, apparatuses, and methods for determining a trustworthiness information of location estimates for electronic devices.

BACKGROUND

People and companies who use positioning technologies to obtain location estimates of various devices face a recent and growing challenge of knowing how reliable the positioning result is.

Crooked parties may have various reasons for spoofing or disturbing positioning technologies, but mainly the reason is financial benefit. Positioning results may be unreliable also due to the weaknesses of or issues in the used positioning solutions.

It is not trivial to know how reliable a positioning result is. The possibility of reliability issues in positioning result is, for example due to the following reasons:
1. regarding Global Navigation Satellite System (GNSS) technology, the positioning result may be spoofed (result falsified) or disturbed (positioning prevented) by purpose;
2. regarding radio signal (such as cellular, Wireless Local Area Network (WLAN), Bluetooth (BT), etc.) based technology, the positioning result may be spoofed or just unreliable (e.g. due to outdated information used as basis in position calculation).

Same challenges may be faced also with other positioning technologies, e.g. technologies based on magnetic field.

Detecting the trustworthiness or degree of trustworthiness is important in many applications and use cases. For example, this can enable to reliably detect that expensive equipment is still at the worksite instead of stolen and transported to somewhere else, to name but one non-limiting example.

SUMMARY OF SOME EXEMPLARY EMBODIMENTS

It is thus, inter alia, an object of the invention to achieve a detecting and reporting of the trustworthiness or degree of trustworthiness of a positioning result.

According to a first exemplary aspect of the present invention, a method is disclosed, the method comprising:
  obtaining one or more pieces of radio environment information representing a first radio environment of a first area that is covered by one or more radio units;
  obtaining or determining a location estimate;
  obtaining one or more pieces of reference radio environment information representing a second radio environment of a second area, wherein the second area at least partially comprises the first area, and wherein the one or more pieces of reference radio environment information were initially gathered prior to the one or more pieces of radio environment information; and
  determining a trustworthiness information indicative of a degree of similarity between the first radio environment represented by the one or more pieces of radio environment information and the second radio environment represented by the one or more pieces of reference radio environment information, wherein the trustworthiness information are determined based at least partially on a comparison of the one or more pieces of radio environment information with the one or more pieces of reference radio environment information.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by an electronic device, e.g. a mobile device (e.g. smartphone, tablet, wearable, Internet-of-Things (IoT)-device, to name but a few non-limiting examples). For instance, the method may be performed and/or controlled by using at least one processor of the electronic device. Alternatively, the method may for instance be performed and/or controlled by a radio unit (e.g. an access point, or a beacon). For instance, the method may be performed and/or controlled by using at least one processor of the radio unit.

According to a further exemplary aspect of the invention, a computer program is disclosed, the computer program when executed by a processor causing an apparatus, for instance a server, to perform and/or control the actions respectively steps of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed units, for instance means, processor, memory, or may further comprise one or more additional units.

According to a further exemplary aspect of the invention, a system is disclosed, comprising:

at least two apparatuses according to any aspect of the invention as disclosed above, configured to perform and/or control the method of the first exemplary aspect as disclosed above at least partially jointly.

In the following, exemplary features and exemplary embodiments of all aspects of the present invention will be described in further detail.

The one or more radio units may for instance advertise availability respectively their presence to one or more electronic devices (e.g. mobile devices). In some cases, they may for instance advertise availability to electronic devices seeking a connection, e.g. via broadcasting signals. Such signals may for instance convey information in the form of packets of pre-defined format. The information may for instance be indicative of at least an identifier of the respective radio unit. The at least one identifier of the respective radio unit may for instance enable an electronic device to identify the respective radio unit, e.g. so that the location of the radio unit may be determinable based at least partially on the at least one identifier of the respective radio unit. The one or more radio units may for instance be visible to any electronic device with suitable radio interface, regardless of whether or not they are known to the respective electronic device.

Such one or more radio units may for instance be used for positioning (e.g. indoor and/or outdoor) purposes, and/or floor detection, e.g. according to BT-, Bluetooth Low Energy (BLE)-, and/or WLAN-specification. Such a respective radio unit of the one or more radio units may for instance be WiFi Access Points, tag-devices, and/or beacon devices, to name but a few non-limiting examples.

Based at least partially on the one or more signals output by the one or more radio units (e.g. WiFi access points), a location estimate may for instance be performed, wherein the location estimate is indicative of an estimation of a current position at which the one or more signals are observable and/or receivable. Such a location estimate may for instance be obtained, e.g. by receiving the location estimate. Alternatively, such a location estimate may for instance be determined by the apparatus, e.g. based at least partially on such one or more signals output by the one or more radio units.

The at least one apparatus may for instance comprise or be connectable to a transceiver (e.g. transmitter and receiver), e.g. according to wireless local area network (WLAN, to BT or to BLE communication standard, to name but a few non-limiting examples).

A plurality of observable signals at a certain location, e.g. by an apparatus (e.g. electronic device) may for instance be gathered (e.g. measured or recorded). The resulting information may for instance be formed into a radio environment information. Such a radio environment information may for instance be formed based at least partially on a fingerprint information. A respective radio environment information may for instance further comprise one or more signal strength values. One or more signal strength values may for instance be determined by measuring one or more signals sent by the one or more radio units, as described above. A respective signal strength value may for instance be represented by a received signal strength value (RSS). Such a received signal strength value may for instance represent the power of a received radio positioning support signal (e.g. sent by a respective radio unit of the one or more radio units). Such a radio positioning support signal may for instance be sent (e.g. periodically) from a respective radio unit of the one or more radio units. An example of a received signal strength parameter is a received signal strength indicator (RSSI) or a representation of a physical receiving power level (e.g. a Rx power level value), e.g. in dBm. A signal strength value may for instance represent a signal strength measurement of the observable signal strength at the certain location, at which the gathering (e.g. measuring) is performed and/or controlled.

The electronic device may for instance be portable (e.g. weigh less than 5, 4, 3, 2, or 1 kg). The electronic device may for instance comprise or be connectable to a display for displaying information, e.g. a route that is guided/navigated to a user, to name but one non-limiting example. The electronic device may for instance comprise or be connectable to means for outputting sound, e.g. in the form of spoken commands or information. The electronic device may for instance comprise or be connectable to one or more sensors for determining the devices position, such as for instance a GNSS receiver, in the form of a GPS receiver. The electronic device may for instance comprise to be connectable to one or more sensors, e.g. in the form of an accelerometer and/or a gyroscope for gathering (e.g. measuring) further information. The electronic device may for instance comprise or be connectable to a receiver and/or a transmitter (e.g. a transceiver) for receiving and/or sending information. For instance, the electronic device may comprise one or more radio receivers (e.g. radio transceivers) to gather one or more pieces of radio environment information, which may for instance enable the devices position to be determined. The electronic device may for instance be suitable for outdoor and/or indoor navigation respectively positioning.

The one or more signals may for instance comprise one or more pieces of information enabling a location at which the one or more signals are observable and/or receivable to be determined. For instance, the one or more signals may for instance comprise a (e.g. position) information indicative of a (current) location of the entity that has output the respective signal. Additionally or alternatively, the one or more signals may for instance comprise the at least one identifier enabling a (current) location of the entity to be determined.

The one or more pieces of radio environment information may for instance be obtained by receiving the one or more pieces of radio environment information, e.g. from an entity that is different from the at least one apparatus. Such a different entity may for instance be a server or another electronic device, comprising or being connectable to a memory in that the one or more pieces of radio environment information are at least temporarily stored prior to the obtaining. For instance, the one or more pieces of radio environment information may for instance be gathered, e.g. by one or more electronic devices, and then be stored in a respective memory of the one or more electronic devices. Then, the one or more pieces of radio environment information may for instance be transmitted to the at least one apparatus for the obtaining.

Alternatively, the one or more pieces of radio environment information may for instance be obtained by gathering (e.g. measuring) the one or more pieces of radio environment information. In this case, the at least one apparatus configured to perform and/or control the method according to the first exemplary aspect of the present invention may for instance be an electronic device. The one or more pieces of radio environment information may for instance be gathered by measuring or observing one or more signals observable and/or receivable at the certain location at which such an obtaining is performed and/or controlled.

The one or more pieces of radio environment information may for instance be indicative of one or more information data points that are gathered in various locations of the first area. The one or more pieces of radio environment information may for instance be indicative of or represent information about (different) radio signal(s), e.g. depending on the location within the first area, and/or the time at which the respective radio environment information of the one or more pieces of radio environment information was (initially) gathered. Additionally or alternatively, the one or more pieces of radio environment information may for instance be indicative of a state of the radio environment in the first area. The state may for instance represent one or more parameters of the one or more radio units, e.g. which one or more signals may for instance be observable and/or receivable at a certain location within the first area. Such a respective parameter of the one or more parameters may for instance be whether or not one or more signals are observable and/or receivable at the certain location (e.g. due to (electromagnetic) shielding of the one or more signals, or the respective radio unit of the one or more radio units not outputting a respective signal at (a) certain time(s) and/or date(s), to name but a few non-limiting examples).

The one or more pieces of reference radio environment information are basically comparable to the one or more pieces of radio environment information. The difference between the two is that the one or more pieces of reference radio environment information are (initially) gathered prior to the (initial) gathering of the one or more pieces of radio environment information, and/or may be gathered by a plurality of electronic devices (e.g. via crowdsourcing). Since the first area may for instance be a part of the second area, the second area may for instance cover a larger area than the first area. Thus, the first area may for instance be represented by the one or more pieces of radio environment information, and the second area may for instance be represented by the one or more pieces of reference radio environment information. It will be understood that all aforementioned and described features of the one or more pieces of radio environment information and/or of a respective radio environment information of the one or more pieces of radio environment information can equally apply and are disclosed herewith with respect to the one or more pieces of reference radio environment information and/or a respective reference radio environment information of the one or more pieces of reference radio environment information.

The one or more pieces of reference radio environment information may for instance be obtained by receiving the one or more pieces of reference radio environment information, e.g. from an entity that is different from the at least one apparatus. Such a different entity may for instance be a server or another electronic device, comprising or being connectable to a memory in that the one or more pieces of reference radio environment information are at least temporarily stored prior to the obtaining. Additionally or alternatively, the one or more pieces of reference radio environment information may for instance be obtained from a memory and/or storage (e.g. a database) that is comprised by or connectable to the at least one apparatus configured to perform and/or control the method according to the first exemplary aspect of the present invention.

The trustworthiness information may for instance be determined by comparing the first radio environment with the second radio environment, wherein the result of the comparison can then be comprised by or be a part of the determined trustworthiness information.

The trustworthiness information may for instance be indicative of a level of probability that the first radio environment of the one or more pieces of radio environment information is related to (e.g. describes) the same area as the second radio environment of the one or more pieces of reference radio environment information (e.g. a first geographic area equals a second geographic area). The trustworthiness information may for instance be represented by a percentage value, and/or an integer value within the limits of 0 and 1. The level of probability may for instance represent the amount (e.g. percentage) of the first area covering the same area than the second area. It will be understood that further features and/or parameters may be utilized to determine the level of probability so that the level of probability is not determined on the feature of comparing covered areas of the first and second area, solely. For instance, alternatively or additionally, the number of same radio units comprised by or being a part of the one or more pieces of radio environment information and of the one or more pieces of reference radio environment information can be utilized to determine the trustworthiness information, to name but one non-limiting example.

According to an exemplary embodiment of all aspects of the present invention, the location estimate is determined based at least partially on the one or more pieces of radio environment information, or the location estimate is obtained by receiving a satellite based positioning information, and/or by receiving an image based positioning information, and/or by receiving a magnetic field based positioning information.

As described above, the one or more radio units may for instance output (e.g. broadcast) one or more signals that are observable at a (certain) location. Based on the one or more signals that are observable at the (certain) location, the location estimate can be determined. It will be understood that such one or more signals output by the one or more radio units may for instance be received prior to the determining of the location estimate. Further, such one or more signals output by the one or more radio units may for instance be comprised by or represented by, at least by a part of, the one or more pieces of radio environment information, so that the location estimate may for instance be determined based at least partially on the obtained one or more pieces of radio environment information as well.

Additionally or alternatively, the location estimate may for instance be obtained (e.g. calculated), by receiving an image based positioning, and/or a magnetic field based positioning information, or some other positioning information of another positioning method. For instance, such positioning methods may be used to verify the location estimate that is determined based at least partially on the one or more pieces of radio environment information. For instance, the image based positioning and/or the magnetic field based positioning information may be determined (prior to the obtaining of them as a respective location estimate) based at least partially on information gathered by a respective image sensor respectively magnetic field sensor. Such an image sensor respectively magnetic field sensor may for instance be comprised by or connectable to an electronic device. After the determining of the respective image based positioning information respectively magnetic field based positioning information, the image based positioning information respectively magnetic field based positioning information can be output. The respective image based positioning information respectively magnetic field based positioning information form a location estimate indicative of an estimation of the (current) location at which the information, e.g. gathered by the respective sensor, were gathered.

According to an exemplary embodiment of all aspects of the present invention, the method further comprises:
   selecting one or more first radio units comprised by the one or more pieces of radio environment that match to one or more second radio units comprised or being a part of the one or more pieces of reference radio environment information, wherein the trustworthiness information is further determined based on the selection.

The one or more pieces of radio environment information and/or the one or more pieces of reference radio environment information may for instance comprise or represent one or more radio units, e.g. of different kinds. For instance, one or more radio units of the one or more pieces of radio environment information and/or the one or more pieces of reference radio environment information may for instance be configured according to wireless communication specification (e.g. WiFi, BT, BLE, and/or ZigBee, to name but a few non-limiting examples), and/or one or more further radio units may for instance be configured according to cellular communication standard (e.g. Global System for Mobile Communications (GSM), General Packet Radio Service (GPRS), Longterm Evolution (LTE), and/or 5G (Fifth Generation, also referred to as "Next Generation Mobile Networks"), to name but a few non-limiting examples). For instance, the one or more pieces of radio environment information and/or the one or more pieces of reference radio environment information may for instance comprise or represent one or more radio units that are configured according to WiFi, BT, BLE, and/or ZigBee communication standard. Alternatively, or additionally, one or more (further) radio units of the one or more pieces of radio environment information and/or the one or more pieces of reference radio environment information may for instance be configured according to GSM, GPRS, LTE, and/or 5G cellular communication standard.

The selecting may for instance be performed and/or controlled by determining the common kinds of radio units that are comprised by or represent both the one or more pieces of radio environment information and the one or more pieces of reference radio environment information, to name but one non-limiting example.

In this way, the reliability of the trustworthiness information representing e.g. a trust index grows due to the selecting of the one or more radio units, based on which the determining (e.g. calculating) of the trustworthiness information using these (common) one or more radio units (e.g. multiple radios or sensors, e.g. WiFi and cellular) is performed and/or controlled.

The time and/or date and/or location at which the respective piece of reference information was gathered refer to the time and/or date and/or location prior to the obtaining of the one or more pieces of reference radio environment information. For instance, the one or more pieces of reference radio environment information may be gathered by one or more electronic devices, e.g. via crowdsourcing. Those gathered one or more pieces of reference radio environment information may for instance be stored in a memory as the one or more pieces of reference information. Those stored one or more pieces of reference radio environment information may for instance be sorted or accumulated based on the time and/or date and/or location at which the respective pieces of reference radio environment information was (initially) gathered.

The one or more pieces of reference radio environment information may for instance represent information data points about the radio units. Those one or more pieces of reference radio environment information may for instance be gathered in various locations, tagged with location information, timestamped, and/or stored in a memory (e.g. storage), for instance in a database. This storage may for instance represent a master database. This storage may for instance be an internet cloud so that it is accessible independently from a location of the at least one apparatus performing and/or controlling the method according to the first exemplary aspect of the present invention.

The one or more pieces of reference radio environment information (the previously gathered and then stored information data points about the radio units) may for instance represent prior knowledge of one or more radio environment circumstances, e.g. at different locations, and additionally or alternatively, at different times. The one or more pieces of reference radio environment information may for instance consist of information about different radio technology signals, depending e.g. on the area and/or the time at which the respective piece of reference radio environment information was gathered. Said radio technology may for instance be or comprise one or more WiFi network signals, cellular networks signals (e.g. GSM, Code Division Multiple Access (CDMA), Wideband CDMA (WCDMA), LTE, Time Division (TD)-Synchronous CDMA (SCDMA), 5G, LTE Cat M1, Narrow Band (NB)-IoT, Long Range (LoRa), and/or SigFox signals, or other cellular signals), BT or BLE or ZigBee signals, or other radio technology signals.

According to an exemplary embodiment of all aspects of the present invention, the one or more pieces of reference radio environment information are continuously gathered.

For instance, one or more pieces of reference radio environment information may be already stored in a memory. One or more further pieces of reference radio environment information can still be gathered by one or more electronic devices, e.g. via crowdsourcing. Those one or more further pieces of reference radio environment information may for instance be stored in the memory as well. It will be understood that the one or more further pieces of reference radio environment information may for instance comprise or are associated with one or more respective pieces of timestamp information indicative of a time and/or a date and/or a location at which the respective piece of reference information was gathered Further, the one or more pieces of reference radio environment information and the respective storing may for instance be continued repeatedly (e.g. at least twice), e.g. performed and/or controlled while (e.g. all of the) other steps of the method are executed.

According to an exemplary embodiment of all aspects of the present invention, the method further comprises:
   gathering the one or more pieces of reference radio environment information prior to the obtaining of the one or more pieces of reference radio environment information; and
   storing the gathered one or more pieces of reference radio environment information.

The one or more pieces of reference radio environment information may for instance be gathered by measuring a plurality of observable signals at a certain location, e.g. by an apparatus (e.g. an electronic device). This plurality of observable signals at a certain location may for instance be gathered (e.g. measured or recorded). It may for instance be gathered which signals are observable, how is the respective signal strength at the certain location, or the like, to name but a few non-limiting examples. The resulting information may for instance be formed into a reference radio environment information. This reference radio environment information can then be stored, e.g. in a memory, as a respective reference radio environment information.

In case a plurality of electronic devices respectively gather a respective radio environment information, and e.g. respectively outputs it to be stored as a respective reference radio environment information, this may for instance be referred to as crowdsourcing.

In case a crowdsourcing volume is decent enough, it may for instance be possible to detect if some information data points representing the respective reference radio environment are tagged with incorrect information, e.g. incorrect location, time, and/or date information, and hence such data points may be discarded when determining the trustworthiness information, e.g. in order to keep the one or more pieces of reference radio environment information as accurate as possible.

According to an exemplary embodiment of all aspects of the present invention, the one or more pieces of radio environment information and/or the one or more pieces of reference radio environment information are indicative of one or more of the following communication networks i) to ii):

i) at least one radio communication network; and
ii) at least one cellular communication network.

The at least one radio communication network may for instance be WiFi, BT, BLE, ZigBee specification, to name but a few non-limiting examples.

The at least one cellular communication network may for instance be according to GSM, UMTS, LTE, 5G communication standard, to name but a few non-limiting examples.

The at least one radio communication network, and/or the at least one cellular communication network may separately or at least partially together comprise the one or more radio units of the first and/or second radio environment.

For instance, the location estimate may be determined (e.g. calculated) based at least partially on the first radio environment, e.g. based on as the certain WiFi access point signals or cellular network signals that are observable at the certain position for which the location estimate is determined.

Alternatively or additionally, a satellite (e.g. GNSS) based location estimate may for instance be determined as a location estimate. For instance, a GNSS based location estimate may for instance be used as a reference location to look up prior information about the radio environment from the master database, represented by the obtainable one or more pieces of reference radio environment information (e.g. gathered at about the same time as the satellite based location estimate).

According to an exemplary embodiment of all aspects of the present invention, the determining of the trustworthiness information further comprises:

determining a number of matching and a number of unmatching radio units based at least partially on a comparison between the one or more pieces of radio environment information and the one or more pieces of reference radio environment information, wherein the number of matching and unmatching radio units is determined based on one or more pieces of identity information comprised or represented by the one or more pieces of radio environment information and the one or more pieces of reference radio environment information, wherein a respective identity information enables uniquely identify a respective radio unit of the one or more radio units.

For instance, the number of matching and the number of unmatching radio units (e.g. access points) may be determined based on the identity of the respective radio unit(s), e.g. represented by (a) respective identity information. Such an identity of the respective radio unit(s) may for instance be an address code and/or identification (ID) code of the respective radio unit (e.g. access point). To name but one non-limiting example, if the first radio environment has the access points A, B, and C, and the second radio environment has the access points B, C, D, and E, it may for instance be determinable that:

two access points (access points B and C) are present in both the first and the second radio environment;

the first radio environment has one additional access point (access point A) compared to the second radio environment; and the second radio environment has two additional access points (access points D and E) compared to the first radio environment.

At least one or all of the abovementioned results of the comparison may for instance be utilized to determine the trustworthiness information.

According to an exemplary embodiment of all aspects of the present invention, the one or more pieces of radio environment information and/or the one or more pieces of reference radio environment information are gathered based at least partially on one or more signals sent by one or more radio units comprised by or being a part of the first and/or second radio environments.

The one or more signals are observable respectively receivable at a certain location and/or certain time and/or certain date, as described above. When comparing the first radio environment of the one or more pieces of radio environment information against the second radio environment of the one or more pieces of reference radio environment information, signals of some other radio technology (or technologies) as present in the second radio environment may for instance not be present as what was used to determine the location estimate, since the location estimate is determined based at least partially on the one or more pieces of radio environment information. For instance, the first radio environment may for instance comprise or may be gathered based at least partially on one or more signals that are observable respectively receivable from one or more radio units, e.g. according to at least one radio communication network specification and at least one cellular communication network specification. According to one or more timestamp information associated with one or more of the pieces of reference radio environment information, at certain times and/or dates, one or more signals of radio units according to at least one radio communication network specification (e.g. WiFi, BT, and/or BLE) may be observable and/or receivable in addition.

According to an exemplary embodiment of all aspects of the present invention, the degree of similarity is determined further based on one or more differences and/or similarities between the first radio environment and the second radio environment.

Besides of using radio environment similarities, differences for determining (e.g. calculating) the trustworthiness information may also be used. Further, it may for instance be possible to additionally or alternatively use other indicators or sensors, such as magnetic field readings or barometer readings that are further utilized for determining (e.g. calculating) the trustworthiness information.

According to an exemplary embodiment of all aspects of the present invention, the determining of the trustworthiness information further comprises:

determining a number and/or identity of access points comprised by or being a part of the one or more pieces of radio environment information, wherein the degree of similarity is determined further based on a comparison of this number and/or identity of access points to a further number of access points comprised by or being a part of the one or more pieces of reference radio environment information.

A respective access point may for instance be a radio unit. An identity of such an access point may for instance be represented by a respective identity information, as described above. Thus, the one or more pieces of radio environment information may for instance comprise or represent, at least partially, one or more pieces of identity information enabling identifying one or more access points that are comprised by the radio environment as represented by the one or more pieces of radio environment information.

The first radio environment may for instance be indicative of a certain number of signals, e.g. which are received from certain radio units adapted as WiFi access points. Out of those, the second radio environment may for instance only contain a part of the certain number of radio units that is less than the one of the first radio environment. Further, the second radio environment may for instance be indicative of one or more additional signals, e.g. which stem from GSM, WCDMA and/or LTE signals of such radio units. For determining the trustworthiness information, because it may for instance be possible that the one or more pieces of radio environment information were (initially) gathered by an electronic device that only has WiFi radio available, presence of GSM, WCDMA and LTE signals in the second radio environment may for instance be ignored in the determining (e.g. evaluation) of the degree of similarity as represented by the trustworthiness information.

Further, the first radio environment may for instance be indicative of a certain number of signals, e.g. which are received from certain radio units adapted as WiFi access points, and additionally a signal of a radio unit adapted according to LTE communication specification. The second radio environment may for instance not be indicative of any WiFi access point signals, but it may be indicative of one or more signals of e.g. several LTE cells, however not of the LTE cell that is comprised by the one or more pieces of the first radio environment information. For determining the trustworthiness information, because it is possible that the electronic device (that initially gathered the one or more pieces of radio environment information and) is e.g. in a public transport vehicle, and all the WiFi access point signals in the first radio environment may be moving objects (and therefore may possibly not be present in the master database), the presence of the WiFi access point signals in the first radio environment may for instance be ignored when determining (e.g. evaluating) the degree of similarity as represented by the trustworthiness information. However, because the LTE cell that is comprised by the one or more pieces of radio environment information is not present in the second radio environment, and on the other hand because the first radio environment does not contain any of the (e.g. LTE) cells present in the second radio environment, the difference is significant, and the trustworthiness information may for instance represent a value of zero or close to zero.

According to an exemplary embodiment of all aspects of the present invention, the degree of similarity is determined to represent a higher degree of similarity in case the number of access points that are used for the comparison grows.

The degree of similarity may for instance be dependent upon the total number of radio units that may for instance be represented by the one or more pieces of radio environment information or the one or more pieces of reference radio environment information. For instance, if the highest number of radio units comprised by or being represented by the one or more pieces of radio environment information (first radio environment) or the one or more pieces of reference radio environment information (second radio environment) is low (e.g. total number is less than 5, 4, 3, 2 radio unit(s), to name but a few non-limiting examples), the degree of similarity can be determined to be relatively low due to the low number of total radio units. Compared to a scenario in which the highest number of radio units comprised by or being represented by the one or more pieces of radio environment information (first radio environment) or the one or more pieces of reference radio environment information (second radio environment) is greater (e.g. total number of radio units is greater than 5, to name but one non-limiting example), the degree of similarity may be relatively higher in case the highest number is greater than in the first case. For instance, in case the highest number of radio units is 15 that are comprised or represented by the one or more pieces of reference radio environment information, and the one or more pieces of radio environment information comprise or represent 13 of the same radio units, the degree of similarity can be determined to be relatively higher compared to another case, since the highest number of radio units that are comprised or represented by the one or more pieces of radio environment information is quite close to the total number of radio units that are comprised or represented by the one or more pieces of reference radio environment information. For instance, in case the total number of radio units that are comprised or represented by the one or more pieces of reference radio environment information is relatively low, e.g. as in rural areas (e.g. two radio units in a certain area (e.g. circular area with radius of 500 m, to name but one non-limiting example), the highest number of radio units that are comprised or represented by the one or more pieces of radio environment information could only be equal to the total number of radio units. Thus, in case the number of radio units that are comprised or represented by the one or more pieces of radio environment information is two, the degree of similarity is high. In contrast, in case the total number of radio units that are comprised or represented by the one or more pieces of reference radio environment information is relatively high, e.g. as in urban areas (e.g. ten radio units in a certain area (e.g. circular area with radius of 500 m, to name but one non-limiting example), the highest number of radio units that are comprised or represented by the one or more pieces of radio environment information could only be equal to the total number of radio units, as well. Thus, in case e.g. eight radio units are comprised or presented by the one or more pieces of radio environment information, the degree of similarity would be high, but relatively lower than the degree of similarity of the aforementioned example in the rural area. In this way, a "density" of radio units with respect to a certain area may for instance be analyzed and considered when determining the degree of similarity.

According to an exemplary embodiment of all aspects of the present invention, the method further comprises:
outputting the trustworthiness information.

The trustworthiness information may for instance be output, e.g. to one or more further apparatuses (e.g. an electronic device, a server, and/or a radio unit, or the like, to name but a few non-limiting examples), or to another apparatus that transfers (e.g. relays) the trustworthiness information to the one or more apparatuses.

The trustworthiness information may for instance be output based on a provisioning request that is received prior to performing and/or controlling the method according to the first exemplary aspect of the present invention. Such a request may for instance request that the trustworthiness information for a (e.g. specific) electronic device that has its location estimate to be determined requested, is provided. Such a request may for instance be related or associated with another request, e.g. of an electronic device that requests its current position respectively location to be determined.

According to an exemplary embodiment of all aspects of the present invention, the method further comprises:
outputting the trustworthiness information to an entity that is different from a respective electronic device, wherein the trustworthiness information is then relayed to the respective electronic device by the entity that is different from the respective electronic device.

According to an exemplary embodiment of all aspects of the present invention, the first and/or second radio environments represent at least a part of a geographic area.

The geographic area may for instance be of a limited size. The geographic area may for instance comprise one or more venues. Such a respective venue may for instance be a building, shopping mall, office complex, public accessible location (e.g. station, airport, university, library, or the like), to name but a few non-limiting examples. The geographic area may for instance be located, at least partially, inside such a venue. In this case, at least a part of the geographic area may for instance be a floor plan respectively map of the respective venue. In case the venue comprises more than one floor, the geographic area may for instance comprise one or more of the floors of the venue. In case the geographic area comprises, at least partially, an outside area, in which e.g. one or more venues may be located, the geographic area may for instance be represented by a map. It will be understood that it may be possible to determine (e.g. generate) a global and/or partial radio map based at least partially on the one or more pieces of reference radio environment information.

Such a global and/or partial radio map may for instance be understood to represent an area of a pre-determined (radio) environment within which the one or more radio units are expected to support e.g. one or more electronic devices to get their respective positions to be determined (e.g. estimated). For instance, the respective radio map may contain or represent a respective radio coverage model for each of the one or more radio units. Therein, a radio coverage model for a respective radio unit may for instance be understood to represent the expected radio coverage associated with the respective radio unit. Based on the respective radio map, it may for instance be determined, whether a certain identifier associated with a respective radio unit are expected to be observable. For instance, the radio map may comprise information indicative of any position within the coverage area covered by the radio map at which (e.g. different) signals output by the one or more radio units or a number of different of such signals are expected to be observable. Such information enabling a radio map to be determined may for instance be gathered, e.g. via crowdsourcing, and then a corresponding radio map may be generated. It will be understood that such a radio map may for instance comprise additional information, e.g. such as RSSi enabling a more accurate determining (e.g. estimating) of a position of a respective electronic device.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
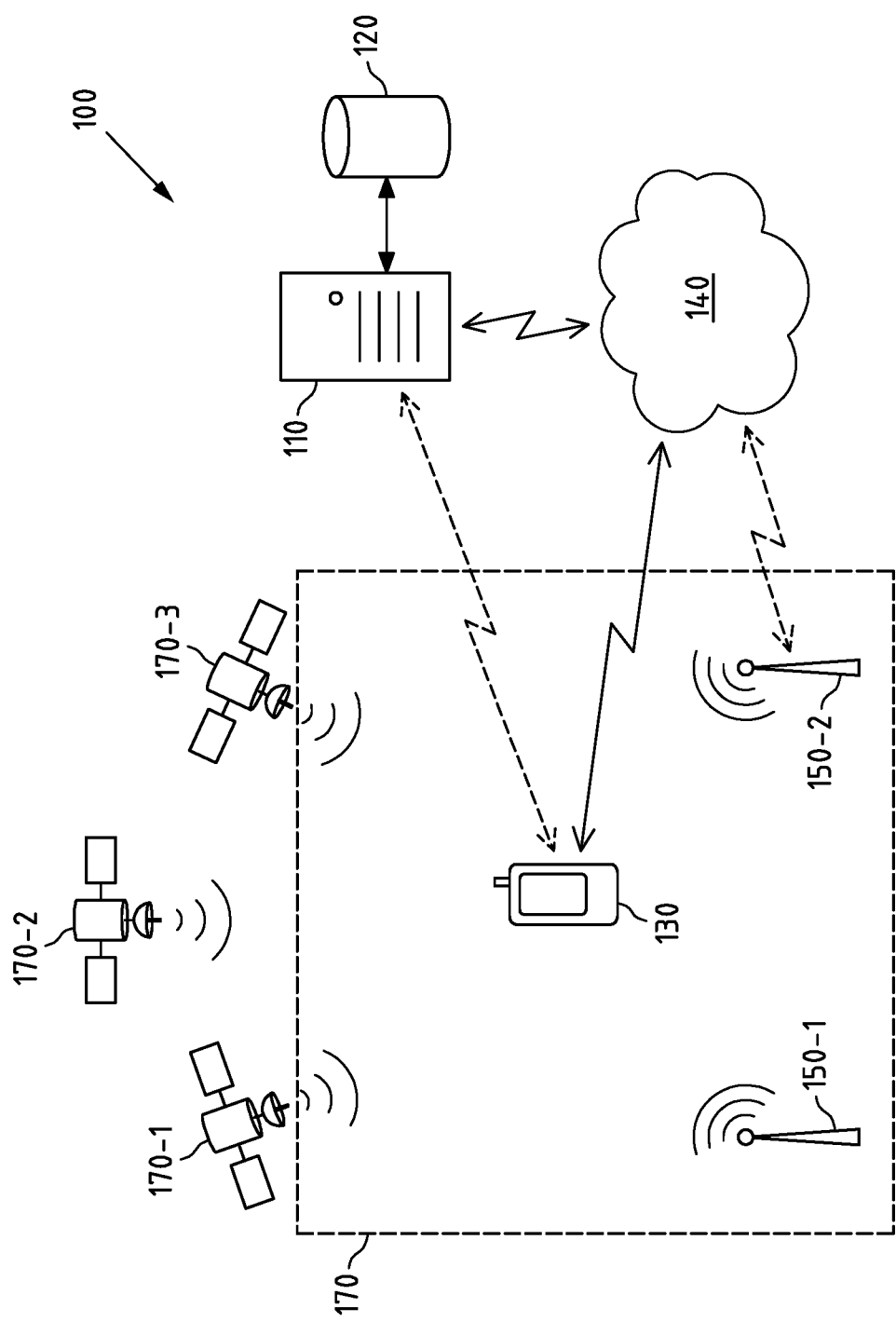
FIG. 1 is a schematic block diagram of a system according to an exemplary aspect of the present invention.

FIG. 1 is a schematic high-level block diagram of a system 100 according to an exemplary aspect of the present invention. Such a system 100 may for instance represent an architecture and/or environment that is/are configured, at least partially, to perform and/or control one or more aspects of the present invention.

System 100 comprises a server 110, an optional database 120, one or more electronic devices 130 (e.g. a smartphone, tablet, wearable, IoT-device; wherein in FIG. 1 only one single device is exemplary shown), and one or more radio units 150 (from which two WiFi and/or BT and/or BLE access points respective beacons 150-1 and 150-2), and one or more satellites 170 (170-1, 170-2, 170-3 are shown in FIG. 1).

The optional database 120 may for instance be comprised by or connectable to server 110. In case optional database 120 is comprised by server 110, server 110 and database 120 may form a single entity. The database 120 may for instance comprise a memory, e.g. for storing one or more pieces of radio environment information, one or more pieces of reference radio environment information, one or more pieces of location estimates, one or more pieces of trustworthiness information, to name but a few non-limiting examples.

System 100 may for instance further comprise a communication network 140. The communication network 140 may for instance be used for transmitting information (e.g. one or more pieces of radio environment information, one or more pieces of reference radio environment information, one or more pieces of location estimates, one or more pieces of trustworthiness information, to name but a few non-limiting examples) between the server 110, the one or more electronic devices 130, and/or the one or more radio units, e.g. configured as access points 150. The communication network may for instance be the Internet and/or a cellular communication network, to name but a few non-limiting examples. It will be understood that communication network 140 may for instance be used for transmitting information between entities, devices, and/or units that are not explicitly shown in FIG. 1 and/or described within the meaning of the present invention. Alternatively, communication network 140 may for instance be configured to transmit information for the entities, devices and/or units that are explicitly shown in FIG. 1 and/or described within the meaning of the present invention.

The server 110 may alternatively be embodied as a server cloud (e.g. a plurality of servers connected, e.g. via the internet, and/or the communication network 140, and providing one or more services at least partially jointly). The server 110, which may for instance be embodied as a positioning respectively navigation server, configured to provide e.g. one or more radio maps, and/or perform and/or control positioning requests to determine (e.g. estimate) one or more positions of one or more electronic devices (e.g. one or more electronic devices 130) to be determined (e.g. estimated, e.g. represented by one or more respective location estimates). The server 110 may for instance be connected to the one or more electronic devices 130, and/or to the one or more radio units 150 via a wirebound and/or wireless communication connection (e.g. according to the WiFi, BT, BLE, and/or ZigBee communication standard, to name but a few non-limiting examples). For instance, such wirebound and/or wireless communication connections may be enabled by the communication network 140.

Electronic device(s) 130, and radio units 150 may for instance be located within an area 160, e.g. a geographic area. Radio units 150 may for instance provide cellular and/or wireless communication services within area 160. Further, satellites 170 may for instance cover area 160 so that one or more signals sent (e.g. via broadcast) may for instance be receivable and/or observable within area 160. Area 160 may for instance be a venue or comprise one or more venues.

Example embodiments according to all aspects of the present invention enable a method, e.g. for detecting and estimating a trustworthiness information indicative of the degree of trustworthiness of a location estimate through:
- optional obtaining or gathering (e.g. repeatedly) information about the radio environment circumstance (e.g. in various locations and storing the information with timestamps to a storage; so-called crowdsourcing);
- obtaining (e.g. receiving) the radio environment state at the place, and optionally at the time where and when a positioning request is issued (e.g. then represented by so-called radio environment A);
- determining (e.g. estimating) a position, e.g. based at least partially on information associated with radio environment A);
- using the estimated position as the reference location;
- obtaining prior knowledge of the radio environment circumstance at the said reference location from the storage (e.g. then represented by so-called radio environment B);
- comparing radio environment A against radio environment B; and
- using the comparison result as basis to determine (e.g. form) the trustworthiness information indicative of a trust index which indicates the level of probability that the two radio environments (radio environment A and radio environment B) describe the same area.

Figure 2:
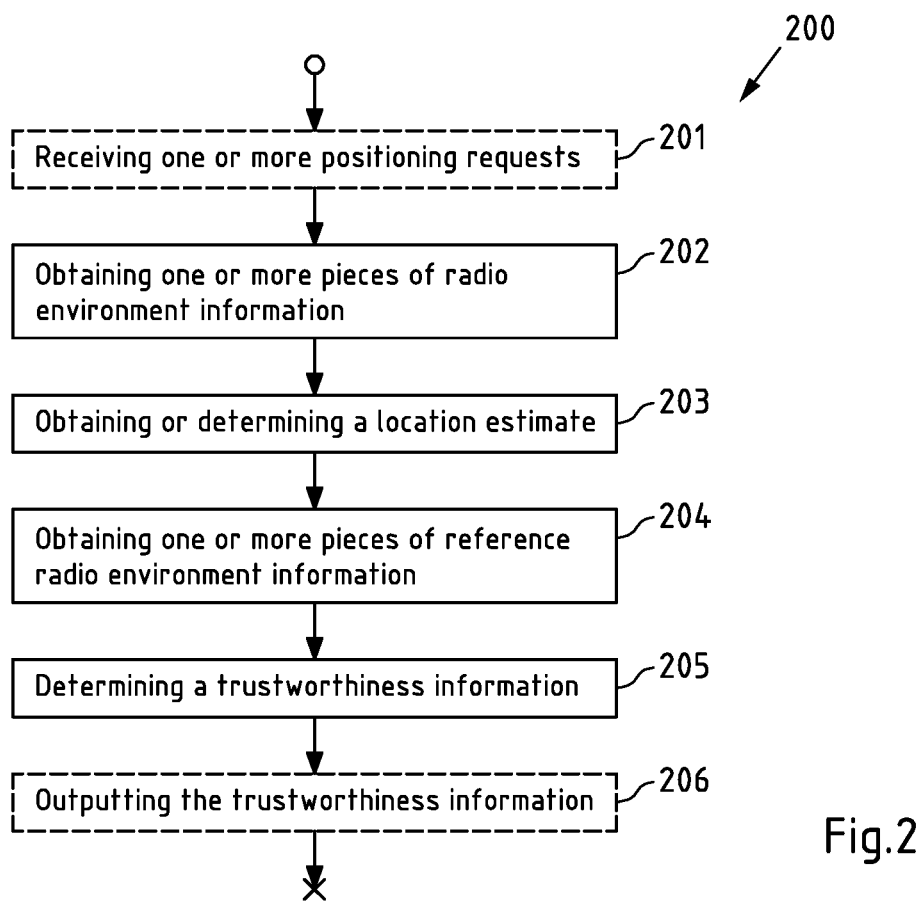
FIG. 2 is a flowchart showing an example embodiment of a method according to the first exemplary aspect of the present invention.

FIG. 2 is a flowchart 200 showing an example embodiment of a method according to the first exemplary aspect of the present invention. This flowchart 200 may for instance be performed by a server, a radio unit, and/or an electronic device, e.g. server 110, radio unit 150-1, 150-2, or electronic device 130 of FIG. 1.

In an optional first step 201, one or more positioning requests may for instance be received. The one or more positioning requests may for instance be received in case flowchart 200 is performed and/or controlled by a server. In this case, the one or more positioning requests may for instance be sent by one or more electronic devices (e.g. electronic device 130), e.g. via communication network 140 of FIG. 1, wherein the one or more electronic devices may for instance request their position (e.g. within venue 170 of FIG. 1) to be determined (e.g. estimated).

In a second step 202, one or more pieces of radio environment information are obtained (e.g. received). The one or more pieces of radio environment information may for instance be received in case the flowchart 200 is performed and/or controlled by server 110, or by at least one of the radio units 150-1 or 150-2 of FIG. 1. Then, the one or more pieces of radio environment information may for instance stem from at least one of the electronic devices 130. The one or more pieces of radio environment information may for instance be part or comprised by one or more positioning requests that are sent from the one or more electronic devices 130, e.g. to server 110, and/or to at least one of the radio units 150. Previously, prior to the obtaining of the one or more pieces of radio environment information, the one or more pieces of radio environment information may for instance be gathered (e.g. measured) by the one or more electronic devices 130, e.g. with one or more sensors and/or one or more radio interface (e.g. in particular for observing or receiving one or more signals sent by the radio units 150-1, 150-2, 170-1, 170-2, 170-3).

Based on the received one or more pieces of radio environment information, in step 203, a location estimate is either obtained (e.g. received) or determined. The location estimate may for instance be determined based at least partially on the one or more pieces of radio environment information that are obtained in step 202. The location estimate may for instance be obtained (e.g. received). For instance, in the latter case, a satellite based positioning information (e.g. a GNSS based location estimate, to name but one non-limiting example) may for instance be received, e.g. from terminal 130 of FIG. 1). The location estimate is indicative of a current position respectively location of the respective electronic device that has sent the one or more pieces of radio environment information, or additionally the respective positioning request.

In a fourth step 204, one or more pieces of reference radio environment information are obtained (e.g. received). In case flowchart 200 is performed by server 110, or by at least one of the radio units 150-1, 150-2, the one or more pieces of reference radio environment information may for instance stem from the database 120 of FIG. 1. Those one or more pieces of reference radio environment information may for instance be stored prior to performing and/or controlling flowchart 200 in the database 120 of FIG. 1.

Based, at least partially, on the one or more pieces of radio environment information obtained in step 202, and/or the pieces of reference radio environment information obtained in step 204, in a fifth step 205, a trustworthiness information is determined. The trustworthiness information is indicative of a degree of similarity between the first radio environment represented by the one or more pieces of radio environment information and the second radio environment represented by the one or more pieces of reference radio environment information.

In an optional step 206, the trustworthiness information determined in step 205 is output, e.g. to the respective device (e.g. one of the electronic devices from which the one or more pieces of radio environment information are obtained in step 202, and/or from which the respective positioning request is received in step 201). The trustworthiness information may for instance be output via the communication network 140 of FIG. 1. Alternatively, the trustworthiness information is output to an entity that is different from the respective device, wherein the trustworthiness information is then relayed to the respective device by the entity that is different from the respective device. For instance, the trustworthiness information is relayed to a management system or monitoring system, that may for instance be a part of a positioning system. Such a management system or monitoring system may for instance oversee respective trustworthiness information of one or more location estimates that are provided by the respective device. Further, in case the trustworthiness information that are provided differ (e.g. over a certain time interval), this may for instance be provided as a feedback as well. In this way, a feedback indicative of a reliability of a determined (e.g. estimated) location estimate, e.g. requested by a respective electronic device) can be given.

It will be understood that at least some of the steps 201 to 206 may for instance be performed and/or controlled by different entities. For instance, steps 201 and 202 may for instance be performed and/or controlled by at least one of the radio units 150-1, or 150-2. Then, step 203 may for instance be performed and/or controlled by server 110. Steps 204 and 205 may for instance be performed either by the respective radio unit (e.g. radio units 150-1 or 150-2 of FIG. 1) or the server 110. Alternatively, one step of the steps 204 and 205 may for instance be performed and/or controlled by the respective radio unit (150-1 or 150-2), and the other step may for instance be performed and/or controlled by the server 110. The step 206 is then e.g. output by the entity that performed and/or controlled step 205 as well.

Figure 3A:
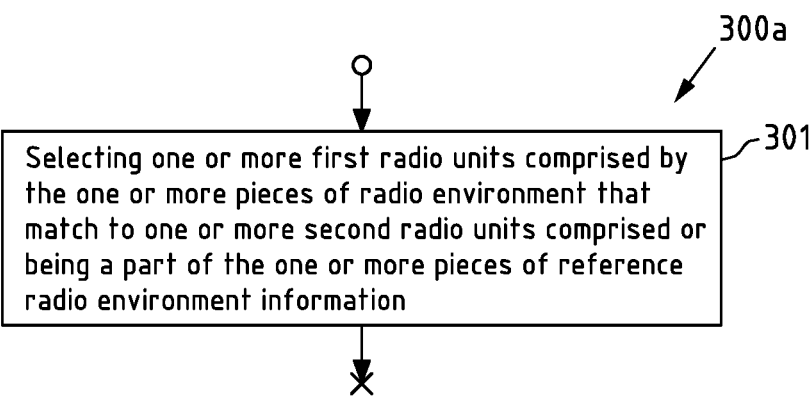
FIG. 3a is a flowchart showing an example embodiment, which may for instance be performed in addition to a method according to the first exemplary aspect of the present invention.

FIG. 3a is a flowchart 300a showing an example embodiment of a method according to the first exemplary aspect of the present invention. This flowchart 300a may for instance be performed by a server, a radio unit, and/or an electronic device, e.g. server 110, radio unit 150-1, 150-2, or electronic device 130 of FIG. 1.

Flowchart 300a comprises an additional step 301 that may for instance be performed in addition to the steps 202 to 205 of flowchart 200. It will be understood that step 301 may for instance be performed in conjunction with step 205 of flowchart 200 in order to determine the trustworthiness information, e.g. directly prior to the step 205 of flowchart 200.

In step 301, one or more first radio units comprised by the one or more pieces of radio environment that match to one or more second radio units comprised or being a part of the one or more pieces of reference radio environment information are selected. It may for instance be determined which common radio units are comprised by the one or more pieces of radio environment information (obtained in step 202) and the one or more pieces of reference radio environment information (obtained in step 204), to name but one non-limiting example. Step 301 may for instance be performed by the same entity that performs and/or controls step 205 of flowchart 200, e.g. at least one of the radio units 150-1, and/or 150-2, or server 110 of FIG. 1.

Figure 3B:
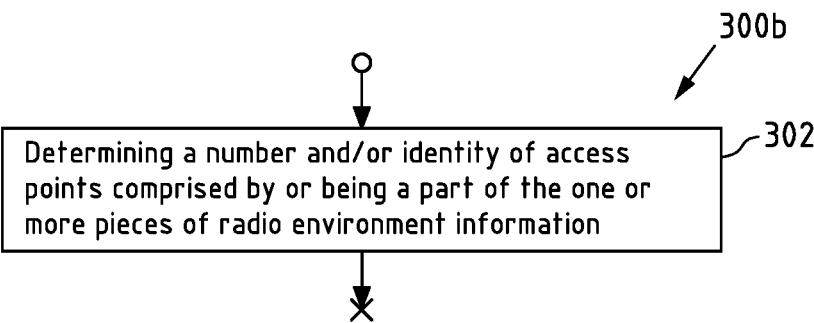
FIG. 3b is another flowchart showing an example embodiment, which may for instance be performed in addition to a method according to the first exemplary aspect of the present invention.

FIG. 3b is a flowchart 300b showing an example embodiment of a method according to the first exemplary aspect of the present invention. This flowchart 300b may for instance be performed by a server, a radio unit, and/or an electronic device, e.g. server 110, radio unit 150-1, 150-2, or electronic device 130 of FIG. 1.

Flowchart 300b comprises an additional step 302 that may for instance be performed in addition to the steps 202 to 205 of flowchart 200. It will be understood that step 302 may for instance be performed in conjunction with step 205 of flowchart 200 in order to determine the trustworthiness information, e.g. directly prior to the step 205 of flowchart 200.

In step 302, a number and/or identity of access points comprised by or being a part of the one or more pieces of radio environment information is determined. It may for instance be determined which number and/or identity of radio units comprised by the one or more pieces of radio environment information (obtained in step 202) are embodied as access points (e.g. according to wireless, BT, and/or BLE communication standard, to name but a few non-limiting examples; e.g. the two radio units 150-1 and 150-2 of FIG. 1) and the one or more pieces of reference radio environment information (obtained in step 204). Step 302 may for instance be performed by the same entity that performs and/or controls step 205 of flowchart 200, e.g. at least one of the radio units 150-1, and/or 150-2, or server 110 of FIG. 1.

Figure 4:
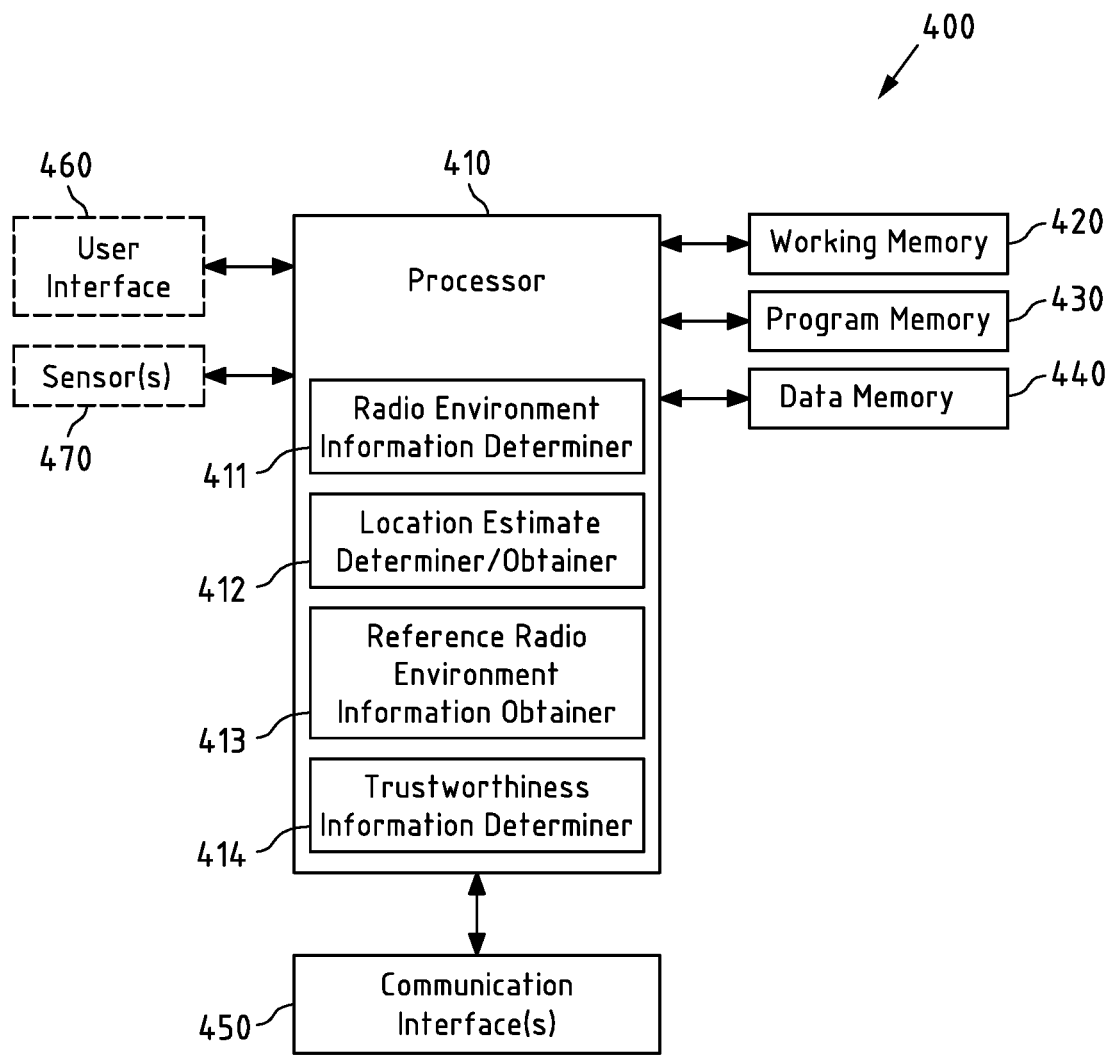
FIG. 4 is a schematic block diagram of an apparatus configured to perform the method according to the first exemplary aspect of the present invention.

FIG. 4 is a schematic block diagram of an apparatus 400 according to an exemplary aspect of the present invention, which may for instance represent the electronic device(s) 130 of FIG. 1. Alternatively, the schematic block diagram of the apparatus 400 according to an exemplary aspect of the present invention may for instance represent server 110 of FIG. 1. Alternatively, the schematic block diagram of the apparatus 400 according to an exemplary aspect of the present invention may for instance represent one of the radio units 150-1, 150-2 of FIG. 1.

Apparatus 400 comprises a processor 410, working memory 420, program memory 430, data memory 440, communication interface(s) 450, an optional user interface 460 and (an) optional sensor(s) 470.

Apparatus 400 may for instance be configured to perform and/or control or comprise respective means (at least one of 410 to 470) for performing and/or controlling the method according to the first exemplary aspect of the present invention. Apparatus 400 may as well constitute an apparatus comprising at least one processor (410) and at least one memory (420) including computer program code, the at least one memory and the computer program code configured to, with the at least one processor, cause an apparatus, e.g.

apparatus 400 at least to perform and/or control the method according to the first exemplary aspect of the present invention.

Processor 410 may for instance comprise a radio environment information obtainer 411 as a functional and/or structural unit. Radio environment information obtainer 411 may for instance be configured to determine a location estimate (see step 202 of FIG. 2).

Processor 410 may for instance comprise a location estimate determiner/obtainer 412 as a functional and/or structural unit. Location estimate determiner/obtainer 412 may for instance be configured to determine a location estimate based at least partially on the obtained one or more pieces of radio environment information (see step 202 of FIG. 2), or to obtain the location estimate (e.g. based on a satellite based positioning information, and/or based on an image based positioning information, to name but a few non-limiting examples) (see step 203 of FIG. 2).

Processor 410 may for instance comprise a reference radio environment information obtainer 413 as a functional and/or structural unit. Reference radio environment information obtainer 413 may for instance be configured to obtain one or more pieces of reference radio environment information (see step 204 of FIG. 2).

Processor 410 may for instance comprise a trustworthiness information determiner 414 as a functional and/or structural unit. Trustworthiness information determiner 414 may for instance be configured to determine a trustworthiness information (see step 205 of FIG. 2).

Processor 410 may for instance further control the memories 420 to 440, the communication interface(s) 450, the optional user interface 460 and the optional sensor(s) 470.

Processor 410 may for instance execute computer program code stored in program memory 430, which may for instance represent a computer readable storage medium comprising program code that, when executed by processor 410, causes the processor 410 to perform the method according to the first exemplary aspect of the present invention.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store one or more pieces of radio environment information, one or more pieces of reference radio environment information, one or more pieces of location estimates, one or more pieces of trustworthiness information, to name but a few non-limiting examples.

Communication interface(s) 450 enable apparatus 400 to communicate with other entities, e.g. with server 110, with electronic device(s) 130 and/or with radio unit(s) 150-1, 150-2 of FIG. 1, dependent upon which of the aforementioned entities apparatus 400 represents. The communication interface(s) 450 may for instance comprise a wireless interface, e.g. a cellular radio communication interface and/or a WLAN interface) and/or wire-bound interface, e.g. an IP-based interface, for instance to communicate with entities via the Internet.

User interface 460 is optional and may comprise a display for displaying information to a user and/or an input device (e.g. a keyboard, keypad, touchpad, mouse, etc.) for receiving information from a user.

Sensor(s) 470 are optional and may for instance comprise a barometric sensor, e.g. to gather pressure information indicative of a (relative) altitude value, and/or an image sensor, and/or a magnetic field sensor, to name but a few non-limiting examples. Such pressure information may for instance be utilized in case of indoor positioning and/or navigation purposes, e.g. floor detection in a venue. The image sensor and/or the magnetic field sensor may for instance enable to gather image respectively magnetic information, wherein such image respectively magnetic information may for instance be utilized to determine an image based positioning information respectively a magnetic field based positioning information indicative of a location at which the respective piece(s) of information was (were) gathered.

Some or all of the units of the apparatus 400 may for instance be connected via a bus. Some or all of the units of the apparatus 400 may for instance be combined into one or more modules.

The following embodiments shall also be considered to be disclosed:

A method for detecting and estimating the degree of trustworthiness of location estimate through obtaining or gathering (e.g. repeatedly) information about the radio environment circumstance in various locations and storing the information with timestamps to a storage;

obtaining the radio environment state at the place and at the time where and when the positioning request is issued (e.g. radio environment A);

using the estimated position (which may be based e.g. on GNSS or the radio environment A) as the reference location;

obtaining the prior knowledge of the radio environment circumstance at the said reference location from the storage (radio environment B);

comparing the radio environment A against the radio environment B; and using the comparison result as basis to form a trust index which indicates the level of probability that the two radio environments describe the same area.

The reliability of the trust index grows if it is calculated using multiple radios or sensors, e.g. WiFi and cellular.

Three different scenarios may for instance apply:

Scenario 1: Trust Index for GNSS Based Location Estimate

Information data points about the radio environment units are gathered in various locations, tagged with location information, timestamped, and stored to a storage, for example to a database. This storage may for instance be called master database, and it typically resides in an internet cloud. Good geographic coverage is achieved when such gathering is done via large scale crowdsourcing. When the crowdsourcing volume is decent enough, it is possible to also detect if some data points are tagged with incorrect location information, and hence such data points can be discarded. The gathered data points are then used to form prior knowledge of the radio environment circumstance at different locations at different times. It may consist of information about different radio technology signals, depending e.g. on the area and the time. The said radio technology may for instance be WiFi network signals, cellular networks signals (e.g. GSM, WCDMA, LTE, CDMA, TD-SCDMA, 5G, LET Cat M1, NB-IoT, LoRa, and/or SigFox signals, or other cellular signals), BT or BLE or ZigBee signals, or other radio technology signals.

When the GNSS based location estimate of a device is obtained at some location, also all available information about the radio environment is obtained at the same time (and location). This may for instance be referred to as radio environment A.

The GNSS based location estimate is used as the reference location to look up prior information about the radio environment from the master database. Such prior information may for instance be referred to as radio environment B.

The radio environment A is then compared against the radio environment B, to find out the degree of similarity between them. Two examples are given in the following:

Example 1

The radio environment A contains signals of 13 WiFi access points. Out of those, the radio environment B contains 11 WiFi access points signals, one additional WiFi access point signal, plus GSM, WCDMA and LTE signals. As an illustration for potential trust index calculation mechanism, because it is possible that the device has only WiFi radio available, presence of GSM, WCDMA and LTE signals in the radio environment B is ignored in the evaluation of the degree of similarity. The two additional WiFi access points in the radio environment A may be moving objects, and hence such difference is not significant. As 11 of the 12 WiFi access point signals present in the radio environment B are also present in the radio environment A, the trust index could be (11/12) or 0.92. Naturally, more sophisticated formulas can be used for trust index calculation.

Example 2

The radio environment A contains signals of five WiFi access points and signal of LTE cell A. The radio environment B contains no WiFi access point signals, but it contains signals of several LTE cells, however not of the LTE cell A.

As an illustration for the trust index calculation, because it is possible that the device is in a public transport vehicle such as a ship and all the WiFi access point signals in the radio environment A are moving object (and therefore not present in the master database), the presence of the WiFi access point signals in the radio environment A may not be significant and is hence ignored in the evaluation of the degree of similarity. However, because the LTE cell A is not present in the radio environment B, and on the other hand radio environment A does not contain any of the LTE cells present in the radio environment B, the difference is significant, and the trust index could be evaluated as 0.

Scenario 2: Trust Index for Radio Environment Based Location Estimate

In this scenario, the location estimate is calculated based on radio environment, such as WiFi access point signals or cellular network signals. This scenario may be further divided into two sub-scenarios:

Scenario 2.A

When comparing the radio environment A against the radio environment B, signals of some other radio technology (or technologies) as present in the radio environment A—i.e. not the same as what was used to calculate the location estimate—are used in the comparison.

Scenario 2.B

If the radio environment A does not contain signals of other radio technologies than the one used for location estimate calculation (even if the radio environment B contains signals of other radio technologies), then the trust index may for instance be calculated by comparing the radio environment units of available radio technology in the radio environment A and the units of the same radio technology in the radio environment B. However, if the radio environment A contains one or only very few different units (which may for instance be due to strict limitation of the data payload size between the device and the network), the trust index may not be possible to calculate and it becomes undefined.

Scenario 3: Trust Index for Location Estimate Based on any Other Technology Than the Ones Described in Scenarios 1 and 2

This scenario follows the same principle as the scenario 1. Here the location estimate may be calculated for example with image based positioning, magnetic field based positioning, or some other positioning method.

Other Considerations

Besides of using radio environment comparison for calculating the trust index, it may for instance be possible to additionally or alternatively use other indicators or sensors, such as magnetic field reading or barometer reading, in calculating the trust index.

Embodiment 1

A method, performed and/or controlled by at least one apparatus, the method comprising:

obtaining one or more pieces of radio environment information representing a first radio environment of a first geographic area that is covered by one or more radio units;

obtaining or determining a location estimate;

obtaining one or more pieces of reference radio environment information representing a second radio environment of a second geographic area, wherein the second geographic area at least partially comprises the first geographic area, and wherein the one or more pieces of reference radio environment information were initially gathered prior to the one or more pieces of radio environment information; and determining a trustworthiness information indicative of a degree of similarity between the first radio environment represented by the one or more pieces of radio environment information and the second radio environment represented by the one or more pieces of reference radio environment information, wherein the trustworthiness information are determined based at least partially on a comparison of the one or more pieces of radio environment information with the one or more pieces of reference radio environment information.

Embodiment 2

The method according to embodiment 1, wherein the location estimate is determined based at least partially on the one or more pieces of radio environment information, or the location estimate is obtained by receiving a satellite based positioning information, and/or by receiving an image based positioning information, and/or by receiving a magnetic field based positioning information.

Embodiment 3

The method according to embodiment 1 or embodiment 2, the method further comprising:
selecting one or more first radio units comprised by the one or more pieces of radio environment that match to one or more second radio units comprised or being a part of the one or more pieces of reference radio environment information, wherein the trustworthiness information is further determined based on the selection.

Embodiment 4

The method according to any of the preceding embodiments, wherein the one or more pieces of reference radio environment information are continuously gathered.

Embodiment 5

The method according to any of the preceding embodiments, the method further comprising:
gathering the one or more pieces of reference radio environment information prior to the obtaining of the one or more pieces of radio environment information; and
storing the gathered one or more pieces of reference radio environment information.

Embodiment 6

The method according to any of the preceding embodiments, wherein the one or more pieces of radio environment information and/or the one or more pieces of reference radio environment information are indicative of one or more of the following communication networks
i) to ii):
i) at least one radio communication network; and
ii) at least one cellular communication network.

Embodiment 7

The method according to any of the preceding embodiments, wherein the determining of the trustworthiness information further comprises:
determining a number of matching and a number of unmatching radio units based at least partially on a comparison between the one or more pieces of radio environment information and the one or more pieces of reference radio environment information, wherein the number of matching and unmatching radio units is determined based on one or more pieces of identity information comprised or represented by the one or more pieces of radio environment information and the one or more pieces of reference radio environment information, wherein a respective identity information enables uniquely identify a respective radio unit of the one or more radio units.

Embodiment 8

The method according to any of the preceding embodiments, wherein the one or more pieces of radio environment information and/or the one or more pieces of reference radio environment information are gathered based at least partially on one or more signals sent by one or more radio units comprised by or being a part of the first and/or second radio environments.

Embodiment 9

The method according to any of the preceding embodiments, wherein the degree of similarity is determined further based on one or more differences and/or similarities between the first radio environment and the second radio environment.

Embodiment 10

The method according to any of the preceding embodiments, wherein the determining of the trustworthiness information further comprises:
determining a number of access points comprised by or being a part of the one or more pieces of radio environment information, wherein the degree of similarity is determined further based on a comparison of this number and/or identity of access points to a further number and/or identity of access points comprised by or being a part of the one or more pieces of reference radio environment information.

Embodiment 11

The method according to any of the preceding embodiments, wherein the degree of similarity is determined to represent a higher degree of similarity in case the number of access points that are used for the comparison grows.

Embodiment 12

The method according to any of the preceding embodiments, the method further comprising:
outputting the trustworthiness information.

Embodiment 13

The method according to any of the preceding embodiments, the method further comprising:
outputting the trustworthiness information to an entity that is different from a respective electronic device, wherein the trustworthiness information is then relayed to the respective electronic device by the entity that is different from the respective electronic device.

Embodiment 14

The method according to any of the preceding embodiments, wherein the first and/or second radio environment represent at least a part of a geographic area.

Embodiment 15

The method according to any of the preceding embodiments, wherein the one or more pieces of reference radio environment information representing the second radio environment are determined to cover basically the same geographic area that is represented by the first radio environment of the one or more pieces of radio environment information.

Embodiment 16

An apparatus configured to perform and/or control or comprising respective means for performing and/or controlling the method of any of the embodiments 1 to 15.

Embodiment 17

An apparatus comprising at least one processor and at least one memory including computer program code, the at least one memory and the computer program code configured to, with the at least one processor, cause an apparatus at least to perform and/or control the method of any of the embodiments 1 to 15.

Embodiment 18

A system, comprising:
at least two apparatuses according to any of the embodiments 16 or 17, configured to perform and/or control the method of according to any of the embodiments 1 to 15 at least partially jointly.

Embodiment 19

A tangible computer-readable medium storing computer program code, the computer program code when executed by a processor causing an apparatus to perform and/or control:
obtaining one or more pieces of radio environment information representing a first radio environment of a first area that is covered by one or more radio units;
obtaining or determining a location estimate;
obtaining one or more pieces of reference radio environment information representing a second radio environment of a second area, wherein the second area at least partially comprises the first area, and wherein the one or more pieces of reference radio environment information were initially gathered prior to the one or more pieces of radio environment information; and
determining a trustworthiness information indicative of a degree of similarity between the first radio environment represented by the one or more pieces of radio environment information and the second radio environment represented by the one or more pieces of reference radio environment information, wherein the trustworthiness information are determined based at least partially on a comparison of the one or more pieces of radio environment information with the one or more pieces of reference radio environment information.

In the present specification, any presented connection in the described embodiments is to be understood in a way that the involved units are operationally coupled. Thus, the connections can be direct or indirect with any number or combination of intervening elements, and there may be merely a functional relationship between the units.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. An apparatus comprising at least one processor and at least one memory including computer program code, the at least one memory and the computer program code configured to, with the at least one processor, cause the apparatus to at least perform:
obtaining one or more pieces of radio environment information representing a first radio environment of a first area that is covered by one or more radio units;
obtaining or determining a location estimate;
obtaining one or more pieces of reference radio environment information representing a second radio environment of a second area, wherein the second area at least partially comprises the first area, and wherein the one or more pieces of reference radio environment information were initially gathered prior to the one or more pieces of radio environment information;
determining a trustworthiness information indicative of a degree of similarity between the first radio environment represented by the one or more pieces of radio environment information and the second radio environment represented by the one or more pieces of reference radio environment information, wherein the trustworthiness information are determined based at least partially on a comparison of the one or more pieces of radio environment information with the one or more pieces of reference radio environment information, and wherein the trustworthiness information comprises a value representing the amount of the first area covering the same area as the second area; and
outputting the trustworthiness information via a communication interface to an entity that is different from the apparatus.

2. The apparatus according to claim 1, wherein the location estimate is determined based at least partially on the one or more pieces of radio environment information, or the location estimate is obtained by receiving a satellite based positioning information, and/or by receiving an image based positioning information, and/or by receiving a magnetic field based positioning information.

3. The apparatus according to claim 1, the at least one memory and the computer program code configured to, with the at least one processor, cause the apparatus further to perform:
selecting one or more first radio units comprised by the one or more pieces of radio environment that match to one or more second radio units comprised or being a part of the one or more pieces of reference radio environment information, wherein the trustworthiness information is further determined based on the selection.

4. The apparatus according to claim 1, the at least one memory and the computer program code configured to, with the at least one processor, cause the apparatus further to perform:
gathering the one or more pieces of reference radio environment information prior to the obtaining of the one or more pieces of radio environment information; and
storing the gathered one or more pieces of reference radio environment information.

5. The apparatus according to claim 1, wherein the determining of the trustworthiness information further comprises:
determining a number of matching and a number of unmatching radio units based at least partially on a comparison between the one or more pieces of radio environment information and the one or more pieces of reference radio environment information, wherein the number of matching and unmatching radio units is determined based on one or more pieces of identity information comprised or represented by the one or more pieces of radio environment information and the one or more pieces of reference radio environment information, wherein a respective identity information enables uniquely identify a respective radio unit of the one or more radio units.

6. The apparatus according to claim 1, wherein the determining of the trustworthiness information further comprises:
determining a number and/or identity of access points comprised by or being a part of the one or more pieces of radio environment information,
wherein the degree of similarity is determined further based on a comparison of this number and/or identity of access points to a further number of access points comprised by or being a part of the one or more pieces of reference radio environment information.

7. The apparatus according to claim 1, wherein the degree of similarity is determined to represent a higher degree of similarity in case the number of access points that are used for the comparison grows.

8. The apparatus according to claim 1, the at least one memory and the computer program code configured to, with the at least one processor, cause the apparatus further to perform:
outputting the trustworthiness information to an entity that is different from a respective electronic device, wherein the trustworthiness information is then relayed to the respective electronic device by the entity that is different from the respective electronic device.

9. The apparatus according to claim 1, wherein the first and/or second radio environments represent at least a part of a geographic area.

10. The apparatus according to claim 1, wherein the one or more pieces of reference radio environment information representing the second radio environment are determined to cover basically the same area that is represented by the first radio environment of the one or more pieces of radio environment information.

11. The apparatus of claim 1, wherein the trustworthiness information represents a probability that the first radio environment at least partially corresponds to the same area as the second radio environment.

12. A method, comprising:
obtaining one or more pieces of radio environment information representing a first radio environment of a first area that is covered by one or more radio units;
obtaining or determining a location estimate;
obtaining one or more pieces of reference radio environment information representing a second radio environment of a second area, wherein the second area at least partially comprises the first area, and wherein the one or more pieces of reference radio environment information were initially gathered prior to the one or more pieces of radio environment information;

determining a trustworthiness information indicative of a degree of similarity between the first radio environment represented by the one or more pieces of radio environment information and the second radio environment represented by the one or more pieces of reference radio environment information, wherein the trustworthiness information are determined based at least partially on a comparison of the one or more pieces of radio environment information with the one or more pieces of reference radio environment information, and wherein the trustworthiness information comprises a value representing the amount of the first area covering the same area as the second area; and outputting the trustworthiness information via a communication interface to an entity.

13. The method according to claim 12, wherein the location estimate is determined based at least partially on the one or more pieces of radio environment information, or the location estimate is obtained by receiving a satellite based positioning information, and/or by receiving an image based positioning information, and/or by receiving a magnetic field based positioning information.

14. The method according to claim 12, the method further comprising:

selecting one or more first radio units comprised by the one or more pieces of radio environment that match to one or more second radio units comprised or being a part of the one or more pieces of reference radio environment information, wherein the trustworthiness information is further determined based on the selection.

15. The method according to claim 12, the method further comprising:

gathering the one or more pieces of reference radio environment information prior to the obtaining of the one or more pieces of radio environment information; and storing the gathered one or more pieces of reference radio environment information.

16. The method according to claim 12, wherein the one or more pieces of radio environment information and/or the one or more pieces of reference radio environment information are indicative of one or more of the following communication networks i) to ii):

i) at least one radio communication network; and ii) at least one cellular communication network.

17. The method according to claim 12, wherein the determining of the trustworthiness information further comprises:

determining a number of matching and a number of unmatching radio units based at least partially on a comparison between the one or more pieces of radio environment information and the one or more pieces of reference radio environment information, wherein the number of matching and unmatching radio units is determined based on one or more pieces of identity information comprised or represented by the one or more pieces of radio environment information and the one or more pieces of reference radio environment information, wherein a respective identity information enables uniquely identify a respective radio unit of the one or more radio units.

18. The method according to claim 12, wherein the determining of the trustworthiness information further comprises:

determining a number of access points comprised by or being a part of the one or more pieces of radio environment information, wherein the degree of similarity is determined further based on a comparison of this number of access points to a further number of access points comprised by or being a part of the one or more pieces of reference radio environment information.

19. The method according to claim 12, wherein the degree of similarity is determined to represent a higher degree of similarity in case the number of access points that are used for the comparison grows.

20. The method according to claim 12, wherein the one or more pieces of reference radio environment information representing the second radio environment are determined to cover basically the same area that is represented by the first radio environment of the one or more pieces of radio environment information.

* * * * *